Patented Oct. 25, 1938

2,134,429

UNITED STATES PATENT OFFICE 2,134,429

RESINOUS ESTERIFICATION PRODUCTS OF INNER ETHERS AND METHODS OF MAKING SAME

Kenneth R. Brown, Tamaqua, Pa., assignor to Atlas Powder Company, Wilmington, Del., a corporation of Delaware No Drawing. Application March 11, 1938, Serial No. 195,380

21 Claims. (Cl. 260—8)

This invention relates to a new type of synthetic resin, and to the method of making the same, and more particularly it relates to a novel resinous material comprising the esterification product of a resinifying polycarboxylic organic acid, either alone or in combination with a fatty oil acid, i. e., an aliphatic long chain saturated or unsaturated monobasic acid, and an inner ether derivable from a straight chain hexahydric alcohol by intramolecular condensation.

This application is a continuation of my prior applications, Serial Nos. 758,865, 758,866, and 758,867 filed December 22, 1934.

One object of my invention is to provide a synthetic resinous product of novel characteristics and constitution which has wide applicability in the industries and great utility in plastic and coating compositions.

Other objects, including the novel method of making the resinous product, will appear from a consideration of the specification and claims.

This invention contemplates the production of resinous materials comprising the esterification products of a resinifying polycarboxylic organic acid (a polycarboxylic organic acid capable of withstanding resinification temperatures without decomposition prior to resin formation) and an inner ether of a straight chain hexahydric alcohol.

The resinifying polycarboxylic organic acid may be either aliphatic or aromatic, or a mixture of two or more polycarboxylic acids of either or both classes may be employed. The anhydride may be used in place of the acid and the term "polycarboxylic organic acid" as employed herein includes the anhydride thereof. As an example of the aromatic polycarboxylic acids, the use of which in many instances is to be preferred, phthalic acid may be mentioned. In the case of an aliphatic polycarboxylic acid, the acid may be saturated, or unsaturated, and may or may not contain hydroxyl groups. Succinic, glutaric, adipic, suberic, azelaic, pimaric, malic, tartaric, maleic, fumaric, mucic and citric acids are examples of polycarboxylic aliphatic acids which are applicable for use.

The inner ether of the straight chain hexahydric alcohol forming the esterification product with the polycarboxylic organic acid may be employed directly in the reaction, or advantageously the inner ether may be formed under the conditions of and during the esterification reaction by utilizing the polyhydric alcohol as the initial material. The inner ethers may be unsubstituted or may contain such non-functional substituents as are compatible with the ring formation and do not prevent the resinifying esterification of the hydroxyl groups during the reaction. The non-functional substitution may be performed on the inner ether or on the hexahydric alcohol before inner ether formation. In this way, the properties of the resinous esterification product may be varied, first, by control of the number of esterifiable hydroxyl groups in the polyhydric inner ether and, secondly, by the character of the non-functional substituent.

The inner ethers may be defined as cyclic carbon-oxygen compounds containing one cyclic oxygen per ring (known as an oxido ring) and derived from a hexahydric alcohol by intramolecular condensation. If only one molecule of water is removed by the intramolecular condensation, a monoanhydro derivative containing only one carbon-oxygen ring is obtained. If the condensation removes two molecules of water from the alcohol, a dianhydro compound containing two carbon-oxygen rings, which may or may not be of the condensed type, is obtained. The number of members in the ring and the number of oxido rings in the inner ether which are possible depend upon the arrangement of the hydroxyl groups in the chain of the hexahydric alcohol from which the inner ether is derived. If the hydroxyl-bearing carbon atoms through which the intramolecular condensation takes place are separated by only one carbon atom, 4-membered carbon-oxygen rings only are possible; if they are separated by two carbon atoms, 5-membered rings are obtained; and if they are separated by three carbon atoms, then 6-membered rings are formed. Whether in any particular intramolecular condensation a mono- or di-anhydro compound is formed depends generally upon the conditions of the reaction, and it is possible to form dianhydro compounds containing different membered carbon-oxygen rings, for example, a compound containing a 4- and a 6-membered ring. As a result of the condensation of the hexahydric alcohols, a mixture of the various inner ethers may be formed.

Of the hexahydric straight-chain alcohols from which the inner ethers are derivable, mannitol and sorbitol, due to their availability, are especially suitable. In order that the structures of certain of the inner ethers may be illustrated, some of these which may be formed from the hexahydric straight-chain alcohols have been chosen as typical.

The 4-membered oxido ring, known as an oxidopropan ring:

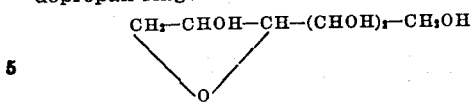

or

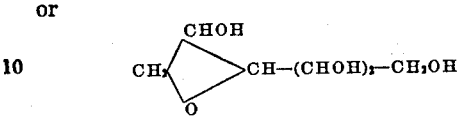

The 5-membered oxido ring, known as a furan ring:

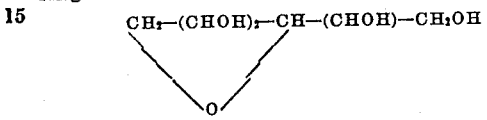

or

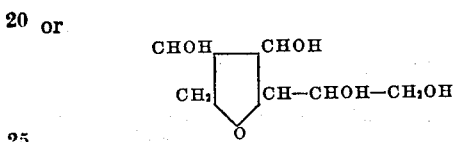

The 6-membered oxido ring, known as a pyran ring:

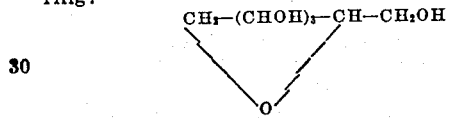

or

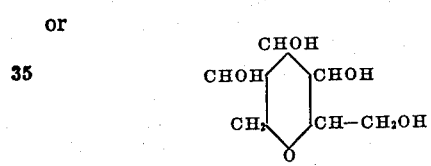

The dianhydro compound containing two condensed 5-membered oxido rings, known as furofuran rings:

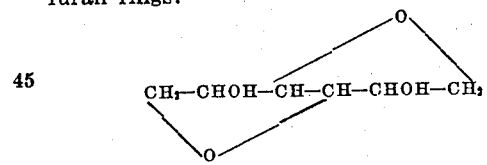

or

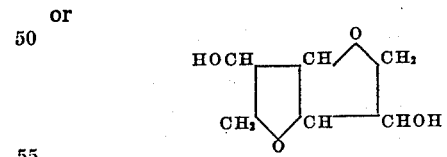

It is to be understood, of course, that the structural formulae given above showing the various rings are merely by way of example, and that the ring formation may take place between any of the other non-adjacent hydroxyl-bearing carbon atoms of the alcohol. With most hexahydric alcohols, and particularly with those especially applicable for use, the inner ether containing the furan ring appears to be the main product obtained as the result of the intramolecular condensation reaction under usual conditions, although smaller amounts of the other inner ethers of both the mono- and di-anhydro type may be present. The inner ethers of the various hexahydric alcohols may also be designated by names derived from the stem of the parent alcohol by adding the characteristic suffix, "itol", for the parent alcohol; "itan" for the cyclic monoanhydro derivative or inner ether; and "ide" for the dianhydro derivative, the dicyclic inner ether: thus, mann-itol, mann-itan, mann-ide; dulc-itol, -itan, -ide, etc. In this connection, it may be mentioned that mannide and isomannide have been used for two definite chemical individuals, but I prefer to consider the terms "itan" and "ide" as descriptive of the classes of mono- and di-anhydro ethers of polyhydric alcohols.

As pointed out, the inner ether may be employed directly in the reaction with the resinifying polycarboxylic organic acid, or the hexahydric alcohol may be used and the inner ether formed during the course of the resin-forming process. The same type of resinous product is formed in both cases, since upon saponification, an inner ether is obtained from both resins and the hexahydric alcohol cannot be regenerated in the case where it is utilized as the original reactant. As the most convenient method of obtaining the inner ethers is by internal condensation of the polyhydric alcohol, usually the intermediate step involving the preparation and separation of the inner ether is dispensed with, and the polycarboxylic organic acid is reacted directly with the polyhydric alcohol. If desired, the inner ether may be obtained from the polyhydric alcohol under any suitable dehydrating conditions, for example, by simple heating at temperatures of 140° C. or upwards. Preferably, however, the heating is carried out in the presence of a dehydrating catalyst of either a basic or acidic nature at temperatures of 140° C. and upwards. The ethers, when formed, are preferably purified by vacuum distillation.

When the hexahydric alcohol is employed as the original reactant, the evidence points to the fact that the intramolecular condensation forming the inner ether takes place before the hydroxyl groups are esterified, but the esterification may possibly take place first. If the latter does occur, however, it is to be understood that it falls within the scope of the invention and within the claims. The claims reciting the esterification of the inner ether are to be understood to include not only the use of the inner ether as the original reactant but also the use of the hexahydric alcohol from which the inner ether is formed.

The useful resinous properties of these esters derive from the fact that they are mixtures of large aggregates built up by esterification from much smaller polyhydroxy inner ether and polybasic acid units. In the elaboration of these large molecules, condensation takes place with the formation not only of straight chains, but also of branched chains and so-called tridimensional molecules which result from the tying together of two or more straight or branched chains by a polybasic acid link.

It is known that the reactivity, and particularly the esterifiability, of hydroxyl groups is affected and diminished by steric hindrance, and that in general the reactivity of functional groups such as hydroxyl or carboxyl decreases with increase in the size of the molecule to which they are attached. Accordingly, the use of stoichiometric proportions of acid and hydroxyl in the production of these resinous esters does not lead to neutral, completely reacted preparations, but gives mixtures of large molecules containing uncombined hydroxyl and carboxyl groups. Also, this effect is more pronounced, the more hydroxyls, and hence the more reactive positions, in the polyhydroxylic starting material, since tri-dimensional molecules form more readily and have in their structure hydroxyls and carboxyls which are no longer in a position to react. So that, where, for instance, hexahydric straight chain alcohols are used as starting material, only a fraction of the total hydroxyl present is active in the resin-forming esterification. In the first place, the original six hydroxyls are diminished by two, due to the formation of the tetrahydric monoanhydro derivative. In the second place, reaction proceeds at such a rate and in such a manner that, under the conditions such as described in the examples, only in the neighborhood of 2½ of the remaining 4 normally esterifiable hydroxyls can be reacted. Increasing the proportion of organic acid used above this amount favors the formation of more partially esterified polycarboxylic organic acid residues, and hence a resinous ester of higher acid number without increasing effectively the amount of total esterification.

In the preferred method of manufacture where a resin of low acid number is desired, the hexahydric alcohol or the inner ether and the organic acid are employed in proportions so that the amount of acid is equivalent to not more than about one-half of the total hydroxyls in the hexahydric alcohol, hence, about three carboxyl equivalents are used. The proportion of acid used can be advantageously reduced to the neighborhood of two and one-quarter carboxyls. When the latter proportions of acid are used in the reaction, the maximum esterification of the hydroxyls is generally attained with the minimum amount of uncombined and partially esterified polycarboxylic acid.

If on the other hand, a resin of higher acid number is desired, the amount of acid employed may be increased to not more than about four acid equivalents per mol of inner ether. If ratios greater than about 4 acid equivalents are employed, the utility of the resinous product is impaired due to larger amounts of uncombined and partially esterified polycarboxylic acid. These carboxyls are distributed between uncombined acid and the free carboxyls of the partially esterified polycarboxylic acid residues, both of which contribute to the high acid number. The higher the amount of acid employed over the combining ratios pointed out above, the higher will be the acid number of the resin due not only to the increase in the amount of excess unreacted acid but also to the larger amount of partially esterified polycarboxylic acid residues present.

Under certain circumstances, we may purposely react even less than the optimum amount of acid to obtain material having a very low acid number and somewhat different solvent properties than the typical esterification product, or to reduce to a minimum the proportion of an expensive ingredient.

The proportions of the components used may thus be regulated according to the requirements of the reaction, or the properties of the finished product, any undesirable excess of any of the ingredients being removed by jetting or extraction with suitable solvents, it being understood that this removal affects only the uncombined ingredients and does not diminish the acidity due to the presence of partially esterified polybasic acid residues. For most purposes, it will be desirable to prepare a product which contains less than one and preferably less than one-half equivalent of uncombined acid per equivalent of resin. By "equivalent of resin" is meant the weight of resin having the esterification product of 1 mol of the inner ether of the parent polyhydric alcohol therein; or where derivatives of more than one polyhydric alcohol are present in the resin, the equivalent of resin is the weight of resin having therein the esterification product of inner ethers, the sum of the mol fractions of which is one.

The fact that the esterification reaction does not involve all the normally esterifiable hydroxyl groups of the hexahydric alcohol when that compound is employed as the initial reactant, and the fact that upon saponification of the esterification product, the inner ether and not the hexahydric alcohol is recovered, show clearly that under the conditions of esterification, the hexahydric alcohol undergoes an intramolecular condensation to form an inner ether, which process obviously reduces the number of hydroxyl groups in the molecule by two for each oxido-ring formed.

The esterification reaction may be carried out in any suitable manner and at any elevated temperature which results in the formation of resinous esterified inner ethers. The optimum temperature for the reaction will depend upon the reactivity of the organic acid or acids employed, and the mixture of the reactants is maintained at the elevated temperature until the esterification is substantially complete. The reaction will take place in the absence of a catalyst, but if it is desired to reduce the length of time required for the reaction, any of the usual esterification catalysts such as boric anhydride or zinc dust may be used. We have found that the quality of the resin may be improved by carrying out the reaction in an inert atmosphere, e. g., in carbon dioxide or nitrogen. Furthermore, we have found it desirable in certain cases to remove excess of volatile ingredients and undesirable volatile by-products formed during the reaction by jetting with inert gases such as carbon dioxide or nitrogen.

The properties of these resinous esterification products depend on the nature and proportion of the reactants, and on the method of preparation. Thus the color, solubility, behavior, mechanical properties, chemical stability, etc., may be altered by using different polybasic acids. Maleic, for example, gives very light, water-soluble materials; and phthalic gives products having higher solubility in hydrocarbon solvents. Merely by varying the heating time, esters ranging in character from soft, readily soluble, highly acid material of low average molecular weight, to highly polymerized, hard, insoluble, infusible products may be obtained. In making esters of this type, the latter stages of the reaction are preferably carried out by heating or curing in ovens. These resinous esters may be used, either alone, mixed with other materials, and/or dissolved in suitable solvents, for use in coating compositions, impregnants, binders, adhesives, insulating material, molding composition, and the like. They may be mixed with drying oils in the preparation of varnishes or, combined with a pigment, in paints. A particularly wide application is in the formulation of lacquers, using the resinous ester, a cellulose derivative such as the nitrate, acetate, or ethyl or benzyl ether, a solvent, a plasticizer, and coloring agents. Since the resinous esters are heat hardening, they are valuable ingredients in baking enamels. Other similar applications will occur to those having acquaintance with this field.

Where phthalic acid is one of the reactants, the properties of the resin may be modified by the replacement of a portion of the polycarboxylic acid by a fatty oil acid, which term as used herein, includes the air-drying acids, and the long chain monobasic organic acids containing at least twelve carbon atoms and not more than one ethylene linkage.

If a resin of the air-drying type is desired, a portion of the polycarboxylic acid (which in the production of air-drying resins should comprise phthalic acid or anhydride, either alone or in admixture with the resinifying, aliphatic polycarboxylic acids set forth above) may be replaced with an air-drying acid. As examples of air-drying acids may be mentioned linoleic, linolenic, eleostearic acid, and other acids characterized by a plurality of double bonds and the property of drying by atmospheric oxidation. Such acids may be obtained synthetically or by saponification of the common drying oils, such as linseed oil, perilla oil, China-wood oil, menhaden oil, and the like. These acids may be employed in pure form, mixed, or containing small amounts of non-drying, aliphatic acids.

In the production of air-drying resins, the ratio of polycarboxylic organic acid to air-drying acid employed in the process may vary widely, depending upon the properties desired in the resinous material. Thus, with a large proportion of air-drying acid and a small amount of polycarboxylic acid, a product is obtained which has properties clearly related to that of a drying oil. By increasing the polycarboxylic acid and decreasing the air-drying acid, the viscosity of the resinous product is increased and its solubility is decreased until, with a very small amount of air-drying acid and a large amount of polycarboxylic acid, an insoluble and infusible product is obtained. In the preparation of resins suitable for synthetic enamels, for instance, a satisfactory mol ratio of linseed oil acids to phthalic anhydride is in the neighborhood of .60 to .80, preferably .75.

Furthermore, valuable properties are imparted to the inner ether resins described herein where the polycarboxylic organic acid comprises phthalic acid or anhydride, either alone or in admixture with the resinifying, aliphatic polycarboxylic acids set forth above, when a monobasic, semi- or non-drying acid is reacted in place of a portion of the polycarboxylic organic acid.

The monobasic acids contemplated for use are long chain acids containing at least twelve carbon atoms and not more than one ethylene linkage. The saturated acids, including those whose formulae may be represented by $C_nH_{2n}O_2$, where $n$ is at least 12, for example lauric, myristic, palmitic, and stearic acids, as well as the unsaturated acids containing only one ethylene linkage, for example oleic and ricinoleic acids, fall within this class. These acids do not possess characteristic air-drying properties. They may be obtained synthetically or more conveniently by saponification of the natural oils, animal or vegetable, such as castor oil, coconut oil, olive oil, lard, tallow, soya bean oil, corn oil, cotton seed oil, and the like, the acids derived from cottonseed oil being known as beta fat. The monobasic acids contemplated herein may be used either pure or in the form of mixtures, which mixtures may contain small amounts of glycerides and more-unsaturated acids.

The ratio of resinifying polycarboxylic organic acid to monobasic semi- or non-drying acid employed in the process may vary widely, depending on the properties desired in the resinous material; in a typical instance, the mol ratio of the monobasic acid to polycarboxylic acid may be from .3 to .9. As the proportion of the monobasic acid is increased, the tendency to gelation and the viscosity in solution decrease while the solubility, the compatibility with oils, the softness, and the weathering resistance increase. By choosing suitable proportions of the polycarboxylic and monobasic acids, the properties of the product may thus be varied from those of an almost insoluble and infusible resin to those of the non- or semi-drying oils.

It is known that in fatty oil acid-modified glycerol base resins, whose greatest usefulness lies in the field of coating compositions, the viscosity decreases as the fatty oil-acid content of the resin is increased. Coating compositions, particularly pigmented types, demand the use of resins having viscosities high enough to keep the pigment satisfactorily suspended during storage. This requirement sets an upper limit to the fatty oil-acid content of technically useful resins. A high drying acid content is, however, desirable, since it confers increased weather resistance and quicker and more extensive drying powers on the finished composition. Similarly, high semi- or non-drying oil-acid content confers increased weather resistance in the finished composition. Furthermore, resins prepared from high semi- or non-drying oil-acid content reaction mixtures have the advantage of high solubility and cheaper solvents.

The use of polyhydroxy cyclic inner ethers in the preparation of fatty oil-modified resins greatly increases the viscosity in ordinary lacquer solvents, and thus permits the preparation of technically valuable resins of much higher fatty oil-acid content than has hitherto been disclosed.

The air-drying resins are particularly applicable in formulating synthetic enamels comprising the resin, a solvent, a pigment, and a siccative, with or without a plasticizer. The semi- or non-drying oil-modified type resins are particularly applicable in the formulation of baking enamels comprising the resin, a solvent and a pigment, with or without a plasticizer. The fatty oil-modified type resins are also particularly useful in the formulation of lacquers, and for this purpose, may be combined with plasticizers, coloring agents and cellulose derivatives of the type previously mentioned. They may also be used in paints, varnishes, binders, adhesives and impregnants with the usual ingredients. Other uses of the fatty oil-modified resinous materials, and the incorporation therewith of other materials, will naturally suggest themselves to those familiar with the field.

The following specific examples are given to illustrate the manner of carrying out my invention and the character of the products derived therefrom.

Example 1

100 parts of phthalic anhydride are mixed with 60 parts of mannitol, this ratio corresponding to 4 equivalents of acid per mol of hexahydric alcohol. The dry mixture is introduced into a reaction vessel and quickly heated to 128° C., causing the mixture to melt. The molten mass is heated at the rate of 2½° C. rise in five minutes until a temperature of 177° C. is reached. The rate of temperature rise is then decreased to 1° C. in five minutes until a temperature of 218° C. is reached. The resulting product is then poured into a mold. The resin is dark brown in color and has a softening point of 112° C.

*Example 2*

182 parts of dry sorbitol and 148 parts of phthalic anhydride are heated in an atmosphere of carbon dioxide and with stirring to 120° C., this ratio corresponding to 2 equivalents of acid per mol of hexahydric alcohol. The mixture is then heated in the course of an hour to 200° C. and held at this temperature for four hours, whereupon it is cast. During this last heating period, the reaction mass is jetted with carbon dioxide. The resin is dark brown in color, has an acid number of 43.4 and a softening point of 89.4° C. This resin is insoluble in ethylene dichloride and in ethyl and butyl acetate; partially soluble in acetone and toluol and soluble in a mixture of alcohol and toluol.

*Example 3*

91.0 parts of mannitol are intimately mixed with 98 parts of maleic anhydride, this ratio corresponding to 4 equivalents of acid per mol of hexahydric alcohol. The mixture is heated in an atmosphere of carbon dioxide to a temperature of 130° C. At this temperature, the mixture becomes molten and stirring is started. The temperature is raised gradually to 180° C. in 75 minutes, a stream of carbon dioxide being passed into the reaction vessel during the heating period. At 180° C., gelatinization occurs. The product on cooling is an almost colorless, hard, vitreous mass, capable of softening on heating.

*Example 4*

93.2 parts of sorbitol syrup obtained from the reduction of glucose and containing 7.03% moisture are heated to 90° C. in an atmosphere of carbon dioxide and 50 parts of maleic anhydride are stirred in, this ratio corresponding to approximately 2 equivalents of acid per mol of hexahydric alcohol. The temperature is raised to 150° C. in the course of an hour. During this time, the mixture is stirred in an atmosphere of carbon dioxide. The resin is cast. It is a clear, almost water white, hard mass, somewhat sticky, soluble in water, with an acid number of 177.

*Example 5*

101 parts of sorbitol syrup produced by the reduction of glucose and containing 7% moisture, 80.1 parts of succinic acid are introduced into a reaction vessel and mixed at a temperature of 100° C., this ratio corresponding to about 2⅔ equivalents of acid per mol of hexahydric alcohol. The temperature is then raised at a rate of ½° C. per minute until a temperature of 195° C. is reached. The product is dark in color, tough and rubbery when hot, and sets to a brittle mass at room temperature.

*Example 6*

210 parts of a sorbitol syrup prepared by the reduction of glucose and containing 7% moisture are heated to 110° C. and 168 parts of tartaric acid monohydrate are stirred in under an atmosphere of carbon dioxide, this ratio corresponding to about 2 equivalents of acid per mol of hexahydric alcohol. The temperature is raised gradually, with stirring under an atmosphere of carbon dioxide, to a temperature of 160° C. in the course of two hours, at the end of which time foaming has ceased. The temperature is held at 160° C. for twenty minutes, at which point the resin is insoluble in ethyl alcohol. After twenty more minutes of heating at 160° C., gelatinization takes place. The product is a light brown resin. The product is soluble in warm water, but is substantially insoluble in the usual organic solvents. Its softening point is 89.5° C.

*Example 7*

One mol of sorbitol and one mol of citric acid are heated to 120° C. This ratio of sorbitol and citric acid corresponds to about 3 equivalents of acid per mol of the hexahydric alcohol. The mixture is stirred in an atmosphere of carbon dioxide during the heating. The temperature of the reaction mixture is raised to 160° C. in the course of an hour. The heating is continued at 160° C. until the reaction mixture becomes too viscous to stir. This will require about one hour. The product is light brown in color. It is soluble in water but is insoluble in the common organic solvents.

*Example 8*

One mol of sorbitol is heated to 80° C. and one mol of maleic anhydride is stirred in. The temperature is raised to 100° C. and one mol of phthalic anhydride is similarly added and stirred into the mixture. This amount of sorbitol and phthalic and maleic anhydride corresponds to about 4 equivalents of acid per mol of the hexahydric alcohol. The temperature of the mixture is then raised gradually with stirring in an atmosphere of carbon dioxide to 195° C. in the course of three hours, at which point the resin gels. The resin is insoluble in the usual organic solvents. The resin, when heat is applied, will soften but will not melt without decomposition. It forms a dark brown vitreous mass when cold.

*Example 9*

To one mol of sorbitol, stirred and heated in an atmosphere of carbon dioxide, 1.125 mols of phthalic anhydride are added at 125° C. This ratio of acid to sorbitol corresponds to 2¼ equivalents of acid per mol of the hexahydric alcohol. Heating is continued at a temperature increase of 1° C. per minute until a temperature of 200° C. is reached. The reaction mixture is heated at this temperature in an atmosphere of carbon dioxide for four hours. At the end of this time, the resinous product is cast in aluminum pans. The resin has a softening point of about 130° C. It is sparingly soluble in a 50–50 mixture of alcohol and toluol and is insoluble in acetone, ethylene dichloride, toluol, butyl and ethyl acetate and alcohol.

*Example 10*

To one mol of mannitol, 1.125 mols of malic acid (corresponding to 2.25 acid equivalents per mol of the hexahydric alcohol) are added. The mixture is heated in an aluminum reaction vessel in an inert atmosphere of carbon dioxide until a temperature of 145° C. is reached. Agitation is then started. Heating is continued so that the temperature rise is 1° C. per minute until a temperature of 180° C. is reached. Heating is continued at this temperature for approximately seventy-five minutes longer. The reaction mixture will then tend to solidify. The resinous reaction mixture is insoluble in the ordinary organic solvents. It is also infusible.

*Example 11*

To one mol of mannitol, 1.125 mols of phthalic anhydride (corresponding to 2.25 acid equivalents per mol of the hexahydric alcohol) are added. The mixture is heated in an aluminum reaction vessel in an atmosphere of carbon dioxide until the solids melt. Agitation is then started. Heating is continued so that the temperature rise will be 1° C. per minute. When a temperature of 200° C. is reached the reaction mixture is held at this temperature for 4½ hours longer, the mixture being stirred in an atmosphere of carbon dioxide. The resinous product is then cast in aluminum pans. It has a softening point of about 106° C. It is soluble in warm acetone, partially soluble in a 50–50 solution of alcohol and toluol, and insoluble in butyl and ethyl acetates, ethylene dichloride, alcohol and toluol.

*Example 12*

To one mol of sorbitol, .281 mol of maleic anhydride and .844 mol of phthalic anhydride (corresponding to 2.25 acid equivalents per mol of the hexahydric alcohol) are added. The mixture is heated to a temperature of 125° C. in an atmosphere of carbon dioxide. At this temperature, the reaction mixture begins to melt and stirring is started. Heating is continued so that the temperature rise will be 1° C. per minute until a temperature of 200° C. is reached. The reaction mixture is heated at 200° C. for four hours, the mixture being agitated in an atmosphere of carbon dioxide during this heating period. At the end of this time, the resinous product is cast in aluminum pans. It has a softening point of approximately 135° C. It is sparingly soluble in a 50–50 mixture of alcohol and toluol and insoluble in acetone, ethylene dichloride, toluol, alcohol and butyl and ethyl acetates.

*Example 13*

One mol of sorbitol and 0.625 mol of linseed oil acid are introduced into an aluminum reaction vessel. The mixture is stirred and heated to a temperature of 120° C. 0.81 mol of phthalic anhydride is added. After these ingredients are added, the temperature is raised uniformly to 200° C. in 100 minutes. The heating is continued at 200° C. for 3 hours. The incorporation and reaction of ingredients is at all times carried out in an atmosphere of carbon dioxide. The heating is stopped and the reaction mixture is cooled to 150° C. under carbon dioxide. At this temperature, the resin is run into aluminum receptacles.

The resin is soluble in V. M. & P. naphtha, toluol, benzol, butyl alcohol, acetone, ethyl and butyl acetate, and cellosolve. When exposed to the action of the air in thin layers such as those obtained by the evaporation of solutions in volatile solvents, the resin dries to a hard, tough, insoluble film. The drying action is accelerated by the addition of siccatives. The viscosity of a 65% solution of this resin in c. p. toluol at 25° C. is about 6.2 poises.

*Example 14*

One mol of sorbitol and 0.64 mol of linoleic acid are heated as in the foregoing example, 0.804 mol of phthalic anhydride is added and the heating continued as there described.

The resin is soluble in V. M. & P. naphtha, toluol, benzol, butyl alcohol, acetone, ethyl and butyl acetate and cellosolve. The resin has drying properties similar to those of the resin described in Example 13.

The viscosity of a 65% solution of this resin in c. p. toluol at 25° C. is about 5.6 poises. The molar ratio of linseed oil acid to phthalic anhydride was 0.80.

*Example 15*

One mol of sorbitol and 0.625 mol of linseed oil acid are heated as described in Example 13. 0.66 mol of phthalic anhydride and 0.14 mol of maleic anhydride are added. The mixture is heated to 200° C. as in Example 13. After a temperature of 200° C. is reached, heating is continued for four hours.

The finished resin is soluble in V. M. & P. naphtha, toluol, benzol, acetone, butyl alcohol, ethyl and butyl acetate, and cellosolve.

The viscosity of a 50% solution of this resin in c. p. toluol is approximately 3.6 poises at 25° C.

*Example 16*

One mol of sorbitol and 0.625 mol of linseed oil acid are heated as described in Example 13. 0.54 mol of phthalic anhydride and 0.274 mol of adipic are added. The mixture is heated as in Example 13.

The finished resin is soluble in V. M. & P. naphtha, toluol, benzol, acetone, butyl alcohol, ethyl and butyl acetate, and cellosolve.

The viscosity of a 65% solution of this resin in c. p. toluol is about 11.5 poises at 25° C.

*Example 17*

One mol of sorbitol and 0.625 mol of Chinawood oil acid are heated as in Example 13. 0.81 mol of phthalic anhydride is added and the heating continued as in Example 13.

The finished resin is insoluble in V. M. & P. naphtha, partially soluble in toluol, benzol, acetone, and butyl and ethyl acetate.

*Example 18*

0.5 mol of linseed oil acid and 0.75 mol of phthalic anhydride are heated together to a temperature of 140° C. with stirring. 1 mol of mannitol is added and heating continued so that the temperature is raised at the rate of 1° C. per minute until a temperature of 200° C. is reached. The heating is continued for 4 hours at this temperature. All mixing and reaction of ingredients are caried out in an atmosphere of carbon dioxide.

The finished resin is soluble in V. M. & P. naphtha, soluble in toluol, benzol, acetone, and butyl and ethyl acetate. The viscosity of a 65% solution of this resin in c. p. toluol is about 32 poises at 25° C.

*Example 19*

182 parts sorbitol and 80 parts beta fat (cottonseed fatty acids) are introduced into an aluminum reaction vessel. The mixture is stirred and heated to 120° C. 145 parts of phthalic anhydride are added. After these ingredients are added, the temperature is raised uniformly at a rate of 1° C. rise per minute until a temperature of 200° C. is reached. The heating is continued at 200° C. for three hours. The incorporation and reaction of ingredients are at all times caried out in an atmosphere of carbon dioxide. The heating is stopped and the reaction mixture is cooled to 150° C. under carbon dioxide. At this temperature, the resin is run into aluminum receptacles.

The resin is soluble in alcohol, ethyl and butyl acetates and acetone. It is partly soluble in toluol and ethylene dichloride and insoluble in V. M. & P. naphtha. It has a softening point of about 78° C. The viscosity of a 65% solution in butyl acetate is about 38 poises at 25° C.

*Example 20*

182 parts of sorbitol and 126 parts of beta fat are heated as in Example 19. 133 parts of phthalic anhydride are added and the heating is continued as in Example 19.

The resin is soluble in alcohol, ethylene dichloride, acetone and butyl and ethyl acetates. It is slightly soluble in toluol and insoluble in V. M. & P. naphtha. A 65% solution of the resin in butyl acetate has a viscosity of about 12 poises at 25° C.

*Example 21*

182 parts of sorbitol and 165 parts of beta fat are heated as in Example 19. 125 parts of phthalic anhydride are added and the heating is continued as in Example 19.

The resin is soluble in acetone, alcohol, ethylene dichloride, and butyl and ethyl acetates. It is partly soluble in toluol and insoluble in V. M. & P. naphtha.

The viscosity of a 65% solution in butyl acetate is about 3.7 poises at 25° C.

*Example 22*

91 parts of sorbitol and 145 parts of stearic acid are heated as in Example 19. 110 parts of phthalic anhydride are added and heating is continued as in Example 19.

The resin is soluble in acetone, butyl and ethyl acetates, ethylene dichloride, V. M. & P. naphtha, alcohol, and toluol. A 65% solution of the resin in butyl acetate has a viscosity of about 1.1 poises at 25° C.

*Example 23*

182 parts of sorbitol and 112 parts of coconut oil acids are heated as in Example 19. 118.5 parts of phthalic anhydride are added and heating is continued as in Example 19.

The resin is soluble in butyl and ethyl acetates, acetone, alcohol, and ethylene dichloride. It is insoluble in V. M. & P. naphtha and partly soluble in toluol. A 65% solution of the resin in butyl acetate has a viscosity of about 5.1 poises, at 25° C.

*Example 24*

182 parts of sorbitol and 140 parts of corn oil acids are heated as in Example 19. 148 parts of phthalic anhydride are added and heating is continued as in Example 19.

The resin is soluble in acetone, alcohol, ethylene dichloride, and butyl and ethyl acetates. It is partly soluble in toluol and V. M. & P. naphtha. A 65% solution of this resin in butyl acetate has a viscosity of about 2.4 poises at 25° C.

*Example 25*

182 parts of sorbitol and 70 parts of oleic acid are heated as in Example 19. 148 parts of phthalic anhydride are added and heating is continued as in Example 19.

The resin is soluble in ethyl and butyl acetates and acetone. It is slightly soluble in toluol and alcohol, and insoluble in ethylene dichloride and V. M. & P. naphtha. A 50% solution of this resin in butyl acetate has a viscosity of about 1.6 poises at 25° C.

*Example 26*

182 parts of sorbitol and 175 parts of ricinoleic acid are heated as in Example 19. 120 parts of phthalic anhydride are added and the heating is continued as in Example 19.

The resin is soluble in alcohol, acetone and ethyl and butyl acetates. It is partly soluble in toluol, and insoluble in ethylene dichloride and V. M. & P. naphtha. A 65% solution of this resin in butyl acetate has a viscosity of approximately 3.1 poises at 25° C.

*Example 27*

138.5 parts of phthalic anhydride and 105 parts oleic acid are heated together in an aluminum reaction vessel to a temperature of 140° C. with stirring. 182 parts of mannitol are added and heating is continued so that the temperature is raised at the rate of 1° C. per minute until a temperature of 200° C. is reached. The heating is continued at this temperature for three hours. All mixing and reaction of ingredients are carried out in an atmosphere of carbon dioxide. The reaction mixture is cooled to 150° C. under carbon dioxide, at which temperature the resin is run into aluminum receptacles.

The resin is soluble in acetone, alcohol, and butyl and ethyl acetates. It is insoluble in ethylene dichloride, V. M. & P. naphtha and toluol.

A 65% solution of this resin in butyl acetate has a viscosity of approximately 6.7 poises at 25° C.

*Example 28*

85 parts of phthalic anhydride and 88.5 parts of palmitic acid are heated as in Example 27. 91 parts of mannitol are added and the heating is continued as in Example 27.

The resin is soluble in acetone, ethylene dichloride and butyl and ethyl acetates. It is partly soluble in toluol and insoluble in V. M. & P. naphtha and alcohol. A 65% solution of this resin in butyl acetate has a viscosity of approximately 7.2 poises at 25° C.

Considerable modification is possible in the choice of the ingredients employed in the esterification reaction as well as in the manipulative steps utilized in the processes, without departing from the essential features of the invention.

What I claim is:

1. The process of making a resinous material comprising an esterification product of an inner ether, which comprises heating together under esterifying conditions resinifying polycarboxylic acid, said acid comprising phthalic acid when fatty oil acid is present in the reacting mixture, and a polyhydroxy inner ether derivable from a straight chain hexahydric alcohol by intramolecular condensation thereof, the number of equivalents of acid present in the reacting mixture being not more than about 4 equivalents per mol of ether.

2. The process of making a resinous material comprising an esterification product of an inner ether which comprises heating together under esterifying conditions phthalic acid and a polyhydroxy inner ether derivable from a straight chain hexahydric alcohol by intramolecular condensation thereof, the number of equivalents of acid present in the reacting mixture being not more than about 4 equivalents per mol of ether.

3. The process of making a resinous material comprising an esterification product of an inner ether which comprises heating together under esterifying conditions phthalic acid and a polyhydroxy inner ether derivable from a straight chain hexahydric alcohol by intramolecular condensation thereof, the number of equivalents of acid present in the reacting mixture being from 2.25 to 3 equivalents per mol of ether.

4. The process of making a resinous material comprising an esterification product of an inner ether which comprises heating together under esterifying conditions phthalic acid, a resinifying aliphatic polybasic acid, and a polyhydroxy inner ether derivable from a straight chain hexahydric alcohol by intramolecular condensation thereof, the number of equivalents of acid present in the reacting mixture being not more than about 4 equivalents per mol of ether.

5. The process of making a resinous material comprising an esterification product of an inner ether which comprises heating together under esterifying conditions phthalic acid, a resinifying aliphatic polybasic acid, and a polyhydroxy inner ether derivable from a straight chain hexahydric alcohol by intramolecular condensation thereof, the number of equivalents of acid present in the reacting mixture being from 2.25 to 3 equivalents per mol of ether.

6. The process of making a resinous material comprising an esterification product of an inner ether which comprises heating together under esterifying conditions phthalic acid, a resinifying aliphatic polybasic acid, fatty oil acid, and a polyhydroxy inner ether derivable from a straight chain hexahydric alcohol by intramolecular condensation thereof, the number of equivalents of acid present in the reacting mixture being not more than about 4 equivalents per mol of ether.

7. The process of making a resinous material having air-drying properties and comprising an esterification product of an inner ether which comprises heating together under esterifying conditions phthalic acid, a resinifying aliphatic polybasic acid, an air-drying acid, and a polyhydroxy inner ether derivable from a straight chain hexahydric alcohol by intramolecular condensation thereof, the number of equivalents of acid present in the reacting mixture being not more than about 4 equivalents per mol of ether.

8. The process of making a resinous material having air-drying properties and comprising an esterification product of an inner ether, which comprises heating together under esterifying conditions phthalic acid, maleic acid, an air-drying acid, and a polyhydroxy inner ether derivable from a straight chain hexahydric alcohol by intramolecular condensation thereof, the number of equivalents of acid present in the reacting mixture being not more than about 4 equivalents per mol of ether.

9. The process of making a resinous material comprising an esterification product of an inner ether which comprises heating together under esterifying conditions resinifying aliphatic polybasic organic acid and a polyhydroxy inner ether derivable from a straight chain hexahydric alcohol by intramolecular condensation thereof, the number of equivalents of acid present in the reacting mixture being not more than about 4 equivalents per mol of ether.

10. The process of making a resinous material comprising an esterification product of an inner ether which comprises heating together under esterifying conditions resinifying aliphatic polybasic organic acid and a polyhydroxy inner ether derivable from a straight chain hexahydric alcohol by intramolecular condensation thereof, the number of equivalents of acid present in the reacting mixture being from 2.25 to 3 equivalents per mol of ether.

11. The process of making a resinous material comprising an esterification product of an inner ether which comprises heating together under esterifying conditions maleic acid and a polyhydroxy inner ether derivable from a straight chain hexahydric alcohol by intramolecular condensation thereof, the number of equivalents of acid present in the reacting mixture being not more than about 4 equivalents per mol of ether.

12. The process of making a resinous material comprising an esterification product of an inner ether which comprises heating together under esterifying conditions phthalic acid, maleic acid and a polyhydroxy inner ether derivable from a straight chain hexahydric alcohol by intramolecular condensation thereof, the number of equivalents of acid present in the reacting mixture being not more than about 4 equivalents per mol of ether.

13. The process of making a resinous material comprising an esterification product of an inner ether, which comprises heating together under esterifying conditions phthalic acid, fatty oil acid, and a polyhydroxy inner ether derivable from a straight chain hexahydric alcohol by intramolecular condensation thereof, the number of equivalents of acid present in the reacting mixture being not more than about 4 equivalents per mol of ether.

14. The process of making a resinous material comprising an esterification product of an inner ether, which comprises heating together under esterifying conditions phthalic acid, fatty oil acid, and a polyhydroxy inner ether derivable from a straight chain hexahydric alcohol by intramolecular condensation thereof, the number of equivalents of acid present in the reacting mixture being from 2.25 to 3 equivalents per mol of ether.

15. The process of making a resinous material having air-drying properties and comprising an esterification product of an inner ether which comprises heating together under esterifying conditions phthalic acid, an air-drying acid and a polyhydroxy inner ether derivable from a straight chain hexahydric alcohol by intramolecular condensation thereof, the number of equivalents of acid present in the reacting mixture being not more than about 4 equivalents per mol of ether.

16. The process of making a resinous material having air-drying properties and comprising an esterification product of an inner ether which comprises heating together under esterifying conditions phthalic acid, an air-drying acid, and a polyhydroxy inner ether derivable from a straight chain hexahydric alcohol by intramolecular condensation thereof, the number of equivalents of acid present in the reacting mixture being from 2.25 to 3 equivalents per mol of ether.

17. The resinous esterification product made in accordance with the process set forth in claim 1.

18. The resinous esterification product made in accordance with the process set forth in claim 2.

19. The resinous esterification product made in accordance with the process set forth in claim 3.

20. The resinous esterification product made in accordance with the process set forth in claim 9.

21. The resinous esterification product made in accordance with the process set forth in claim 10.

KENNETH R. BROWN.